(12) United States Patent
Wang et al.

(10) Patent No.: US 12,131,444 B2
(45) Date of Patent: Oct. 29, 2024

(54) NOISE REDUCTION CONVOLUTION AUTO-ENCODING DEVICE AND NOISE REDUCTION CONVOLUTION AUTO-ENCODING METHOD

(71) Applicant: Acer Incorporated, New Taipei (TW)

(72) Inventors: Liang-Yao Wang, New Taipei (TW); Sau-Gee Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 392 days.

(21) Appl. No.: 17/574,707

(22) Filed: Jan. 13, 2022

(65) Prior Publication Data

US 2023/0153951 A1    May 18, 2023

(30) Foreign Application Priority Data

Nov. 17, 2021 (TW) .................................. 110142692

(51) Int. Cl.
*G06T 5/70* (2024.01)
*G06N 3/04* (2023.01)
*G06T 3/40* (2024.01)

(52) U.S. Cl.
CPC .............. *G06T 5/70* (2024.01); *G06N 3/04* (2013.01); *G06T 3/40* (2013.01); *G06T 2207/20084* (2013.01)

(58) Field of Classification Search
CPC ... G06T 5/70; G06T 3/40; G06T 2207/20084; G06T 5/60; G06T 2207/20081; G06N 3/04

(Continued)

(56) References Cited

U.S. PATENT DOCUMENTS

2018/0293711 A1* 10/2018 Vogels .................... G06F 17/10
2021/0383538 A1* 12/2021 Deasy ...................... G06N 7/01

FOREIGN PATENT DOCUMENTS

WO    2020/165196 A1    8/2020

OTHER PUBLICATIONS

Extended European Search Report dated Jul. 29, 2022, issued in application No. EP 22152880.5.

(Continued)

*Primary Examiner* — Kathleen Y Dulaney
(74) *Attorney, Agent, or Firm* — McClure, Qualey & Rodack, LLP (57) ABSTRACT

The noise reduction convolutional auto-encoding method includes the following tasks. A distorted image is received and input into a noise reduction convolutional auto-encoding model. In the noise reduction convolutional auto-encoding model, an image feature of the distorted image is transferred to a first deconvolution layer through skip-connection. A plurality of multi-stride encoding convolutional layers are performed for the distortion image to reduce a dimension. A same-dimensional encoding convolutional layer is then performed. According to the corresponding multi-stride encoding convolutional layers and same-dimensional encoding convolutional layers, the corresponding a plurality of decoding multi-stride convolutional layers and a same-dimensional decoding convolutional layers are upgraded. The result of up-scaled dimension is input into the same-dimensional decoding convolutional layer of a balanced channel using the first deconvolution layer. A reconstructed image is output from the same-dimensional decoding convolutional layer of the balanced channel.

8 Claims, 10 Drawing Sheets

(58) Field of Classification Search
USPC .................................. 382/100, 254, 232
See application file for complete search history.

(56) References Cited

OTHER PUBLICATIONS

Shahab Uddin, A.F.M., et al.; "A Perceptually Inspired New Blind Image Denoising Method Using L1 and Perceptual Loss;" IEEE Access; vol. 7; Jul. 2019; pp. 90538-90549.
Liu, D., et al.; "Connecting Image Denosing and High Level Vision Tasks via Deep Learning;" Sep. 2018; pp. 1-11.
Dong, J.F., et al.; "Learning Deep Representations Using Convolutional Auto-Encoders with Symmetric Skip Connections;" IEEE; 2018; pp. 3006-3010.
Zhao, G., et al.; "A Deep Cascade of neural networks for image inpainting, deblurring and denosing;" Multimed Tools Appl; Nov. 2017; pp. 29589-29604.
Peng, Y.T., et al.; "Image Impulse Noise Removal Using Cascaded Filtering Based on Overlapped Adaptive Gaussian Smoothing and Convolutional Refinement Networks;" IEEE Open Journal of the Computer Society; Oct. 2021; pp. 382-392.
Peng, Y., et al.; "Dilated Residual Networks with Symmetric Skip Connection for image denoising;" Neurocomputing; 2018; pp. 67-76.

\* cited by examiner

NOISE REDUCTION CONVOLUTION AUTO-ENCODING DEVICE AND NOISE REDUCTION CONVOLUTION AUTO-ENCODING METHOD

CROSS REFERENCE TO RELATED APPLICATIONS

The present application is based on, and claims priority from, Taiwan Patent Application No. 110142692, filed on Nov. 17, 2021, the disclosure of which is hereby incorporated by reference herein in its entirety.

BACKGROUND OF THE INVENTION

Field of the Invention

The present invention relates to an image noise reduction device, and in particular to a noise reduction convolutional auto-encoding device and a noise reduction convolutional auto-encoding method.

Description of the Related Art

Due to the vigorous development of deep learning, more and more documents use deep learning methods for image denoising. In the early days, Viren Jain and H. Sebastian Seung were pioneers in proposing the use of convolutional neural networks as image denoising architecture, and provided performance comparable to traditional image processing methods, but the structure was too simple. More recent technologies include Residual Encoder-Decoder Networks ("RED-Net"). However, RED-Net also has the disadvantage that it needs to use a very deep network to train to improve the denoising performance, resulting in the need for a lot of calculations.

In addition, most methods that use deep learning methods to remove noise or deblurring need to modify or retrain the model architecture according to different types of distortion, and after the model is trained, only a single type of distortion can be processed. However, in the real world, it is impossible to determine what kind of distortion will appear in the input picture, and the types of distortion are random and diverse.

Therefore, how to construct and train a single denoising convolutional auto-encoder model architecture has become one of the problems to be solved in the field, wherein the model only needs a few training iterations before it can remove multiple types of image distortion and achieve the same level as the current technology—not just for a single type of noise or blurry distortion.

BRIEF SUMMARY OF THE INVENTION

The present invention provides a noise reduction convolutional auto-encoding device. The noise reduction convolutional auto-encoding device includes a processor and a storage device. The processor is configured to access a noise reduction convolutional auto-encoding model stored in the storage device, in order to execute the noise reduction convolutional auto-encoding model. The processor executes the following operations. A distorted image is received and then input into the noise reduction convolutional auto-encoding model. In the noise reduction convolutional auto-encoding model, an image feature of the distorted image is transferred to a first deconvolution layer through skip-connection. A plurality of multi-stride encoding convolutional layers are performed for the distortion image to reduce a dimension, and then a same-dimensional encoding convolutional layer is performed. according to the corresponding multi-stride encoding convolutional layers and same-dimensional encoding convolutional layers, the corresponding a plurality of decoding multi-stride convolutional layers and a same-dimensional decoding convolutional layers are upgraded. The first deconvolution layer inputs the result of up-scaled dimension to the same-dimensional decoding convolutional layer of a balanced channel. A reconstructed image is output by the same-dimensional decoding convolutional layer of the balanced channel.

The present invention provides a noise reduction convolutional auto-encoding method. The noise reduction convolutional auto-encoding method includes the following operations. A distorted image is received and input into a noise reduction convolutional auto-encoding model. In the noise reduction convolutional auto-encoding model, an image feature of the distorted image is transferred to a first deconvolution layer through skip-connection. A plurality of multi-stride encoding convolutional layers are performed for the distortion image to reduce a dimension. A same-dimensional encoding convolutional layer is performed. According to the corresponding multi-stride encoding convolutional layers and same-dimensional encoding convolutional layers, the corresponding a plurality of decoding multi-stride convolutional layers and a same-dimensional decoding convolutional layers are upgraded. The first deconvolution layer inputs the result of up-scaled dimension to the same-dimensional decoding convolutional layer of a balanced channel. A reconstructed image is output by the same-dimensional decoding convolutional layer of the balanced channel.

The noise reduction convolutional auto-encoding device and the noise reduction convolutional auto-encoding method described in the present invention can simultaneously denoise or eliminate blurring of different types of distorted images, and the noise reduction convolutional auto-encoding device has a simple structure, only needing to be trained once. By using skip-connection to transfer image features to the deconvolution layer, it aids in deconvolution to restore a better, clearer image. Using multi-stride encoding convolutional layers and multi-stride decoding convolutional layers to increase and decrease the dimensionality of the image can achieve better denoising performance. Moreover, adding the same-dimensional encoding convolutional layer and same-dimensional decoding convolutional layer after multi-stride encoding convolutional layers and multi-stride decoding convolutional layers can prevent the blocking effect. The blocking effect is caused by multi-stride encoding convolutional layers and multi-stride decoding convolutional layers. The blocking effect can affect the restored feature image. Then, performing the feature extraction again can reduce the noise transmitted by skip-connection.

In addition, the noise reduction convolutional auto-encoding device and the noise reduction convolutional auto-encoding method design a loss function by combining the mean square error and structural similarity index measurement to update the weights. When finally performing collaborative training on pictures with different distortion types, the weights can adapt to different distortions. The foregoing experimental results show that the noise reduction convolutional auto-encoding device used for noise reduction not only achieves the same results as the known technology in reducing Gaussian noise, but can also reduce speckle noise and salt and pepper noise at the same time. Moreover, the noise reduction convolutional auto-encoding device and noise reduction convolutional auto-encoding method have excellent performance. The noise reduction convolutional auto-encoding device is used to eliminate blur. It can eliminate Gaussian blur and motion blur at the same time with the same performance as other documents.

In addition, though the noise reduction convolutional auto-encoding device and the noise reduction convolutional auto-encoding method combine a noise reduction convolutional auto-encoding model with a deep convolutional neural network (VGG-16), the application of the noise reduction convolutional auto-encoding device can significantly improve the accuracy of the convolutional network's recognition of distorted images, and prove that a single noise reduction convolutional auto-encoding model only needs to be trained once to be able to reconstruct images from a variety of different types of distortion.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
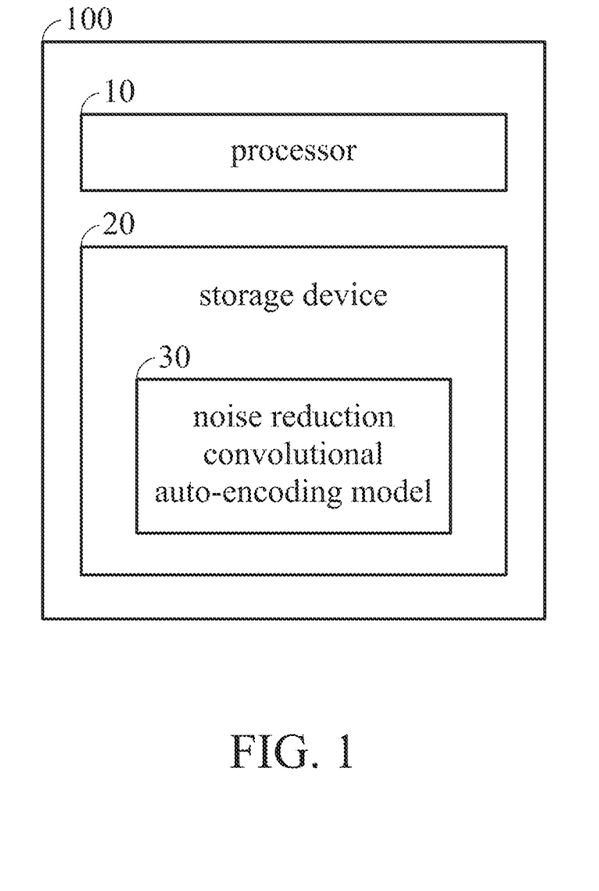
FIG. 1 is a block diagram of a noise reduction convolutional auto-encoding device in accordance with one embodiment of the present disclosure.
Figure 2:
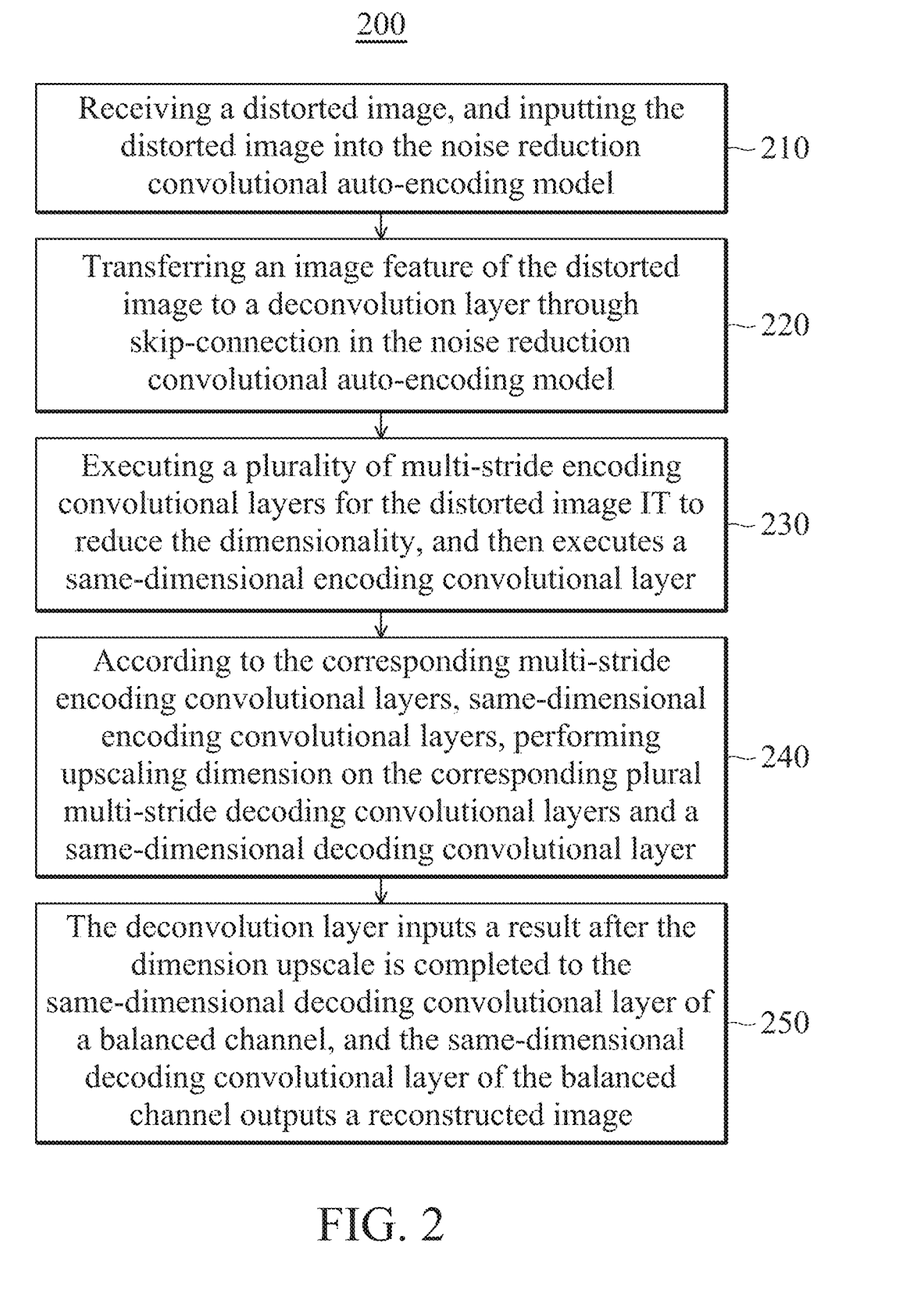
FIG. 2 is a flowchart of a noise reduction convolutional auto-encoding method in accordance with one embodiment of the present disclosure.

Please refer to FIGS. 1-2, FIG. 1 is a block diagram of a noise reduction convolutional auto-encoding device 100 in accordance with one embodiment of the present disclosure. FIG. 2 is a flowchart of a noise reduction convolutional auto-encoding method 200 in accordance with one embodiment of the present disclosure. In one embodiment, noise reduction convolutional auto-encoding method 200 can be implemented by the noise reduction convolutional auto-encoding device 100.

As shown in FIG. 1, the noise reduction convolutional auto-encoding device 100 can be a desktop computer, a mobile phone, or a virtual machine built on a host operation system.

In one embodiment, the function of the noise reduction convolutional auto-encoding device 100 can be implemented by a hardware circuit, chip, firmware, or software.

In one embodiment, the noise reduction convolutional auto-encoding device 100 includes a processor 10 and a storage device 20. In one embodiment, the noise reduction convolutional auto-encoding device 100 further includes a display.

In one embodiment, the processor 10 can be a microcontroller, a microprocessor, a digital signal processor, or an application specific integrated circuit (ASIC), or a logic circuit to implement it.

In one embodiment, the storage device 20 can be implemented by a read-only memory, a flash memory, a floppy disk, a hard disk, a compact disk, a flash drive, a magnetic tape, a network accessible database, or a storage medium having the same function by those skilled in the art.

In one embodiment, the processor 10 is configured to access programs stored in the storage device 20 to implement the noise reduction convolutional auto-encoding method 200.

In one embodiment, a noise reduction convolutional coding model 30 generated by the noise reduction convolutional auto-encoding device 100 can be implemented by hardware, software, or firmware.

In one embodiment, the noise reduction convolutional coding model 30 implements its functions by software or firmware, and is stored in the storage device 20. The noise reduction convolutional auto-encoding device 100 accesses the noise reduction convolutional coding model 30 stored in the storage device 20 through the processor 10 to realize the function of the noise reduction convolutional auto-encoding device 100.

Figure 3:
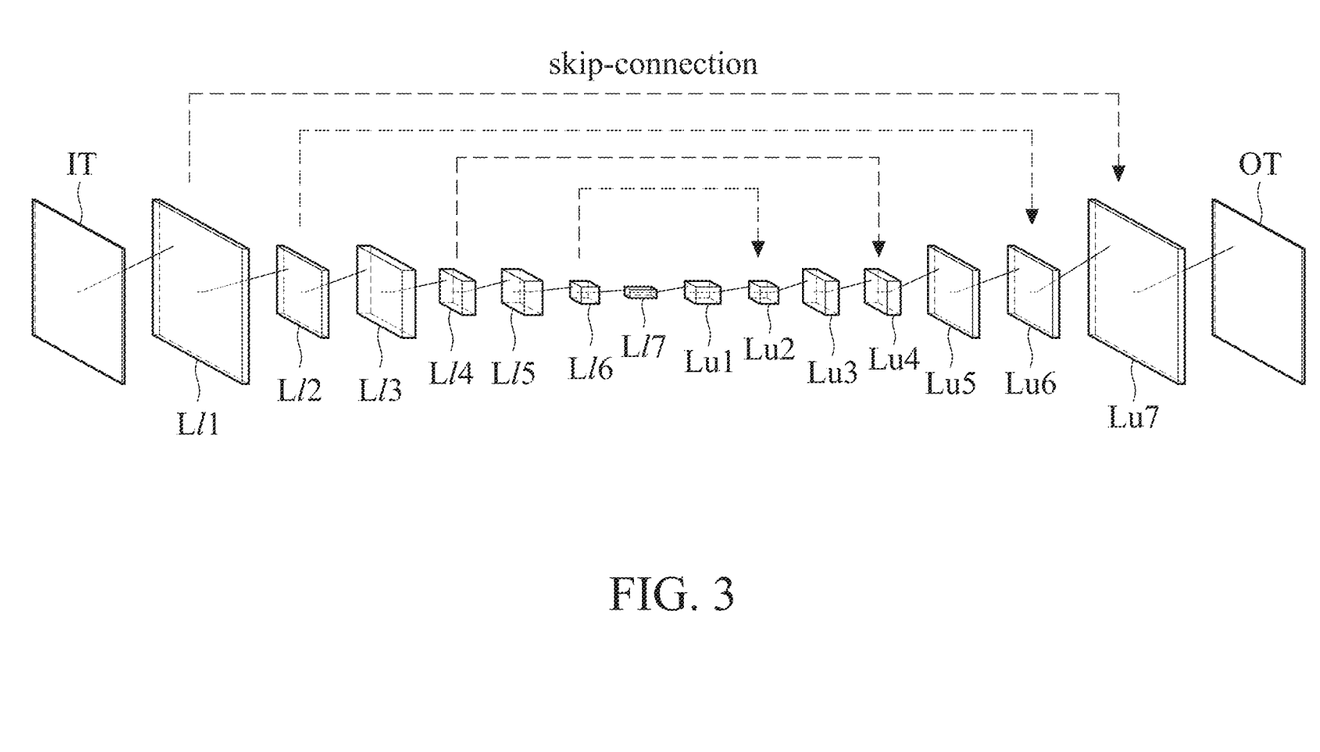
FIG. 3 is a schematic diagram illustrating a noise reduction convolutional auto-encoding method in accordance with one embodiment of the present disclosure.

Please refer to FIGS. 2 to 3 together. FIG. 3 is a schematic diagram illustrating a noise reduction convolutional auto-encoding method in accordance with one embodiment of the present disclosure.

In step 210, the processor 10 receives a distorted image IT, and inputs the distorted image IT into the noise reduction convolutional auto-encoding model 30.

In step 220, the processor 10 transfers an image feature of the distorted image to a deconvolution layer Lu7 through skip-connection in the noise reduction convolutional auto-encoding model 30.

As shown in FIG. 3, the architecture of the noise reduction convolutional auto-encoding model 30 can be divided into two parts: dimensionality reduction operation and dimensionality upscaling operation. The distorted image IT input into the noise reduction convolutional auto-encoding model 30, and the dimensionality reduction is firstly performed. The dimensionality reduction operation involves sequentially executing the convolutional layers L11-L17, capturing the image features of the distorted image IT. Then, perform the dimension upscaling operation. The dimension upscaling operation includes the sequential execution of the convolutional layers Lu1-Lu7. Finally, a convolution is performed after the convolution layer Lu7, and then the reconstructed image OT is outputted.

In one embodiment, skip-connection refers to transferring the result of the dimensionality reduction operation in the convolutional layers L11-L17 during the dimensionality reduction operation to the corresponding convolutional layers Lu1-Lu7 of the dimensional upscaling computing layer during the dimensionality upscaling operation. For example, as shown in FIG. 3, the convolutional layer L11 skip-connection to the convolutional layer Lu7, the convolutional layer L12 skip-connection to the convolutional layer Lu6, the convolutional layer L14 skip-connection to the convolutional layer Lu4, and the convolutional layer L16 skip-connection to the convolutional layer Lu2.

In one embodiment, after distorted image IT inputs into the noise reduction convolutional auto-encoding model 30, each multi-stride encoding convolutional layer and same-dimensional encoding convolutional layer in noise reduction convolutional auto-encoding model 30 outputs their respective images features, and the respective image features are connected to the corresponding multi-stride decoding convolutional layers and same-dimensional decoding convolutional layers through skip-connection.

In one embodiment, the image features transmitted to these multi-stride decoding convolutional layers or same-dimensional decoding convolutional layers are used as reference features during decoding.

Therefore, the application of skip-connection can transmit the image features calculated by the dimensionality reduction of each layer to the corresponding convolutional layer in the dimensionality upscaling process.

In step 230, the processor 10 executes a plurality of multi-stride encoding convolutional layers for the distorted image IT to reduce the dimensionality, and then executes a same-dimensional encoding convolutional layer.

In one embodiment, as shown in FIG. 3, the processor 10 executes a plurality of multi-stride encoding convolutional layers L11-L12 for the distorted image IT to reduce dimensionality (referring to the dimensionality reduction operation relationship between the data of the convolutional layer L11 and L12, the same hereinafter). Then the same-dimensional encoding convolutional layer L12-L13 is executed (referring to the same-dimensional operation relationship between the data of the convolutional layer L12 and L13, the same hereinafter). Then, a plurality of multi-stride encoding convolutional layers L13-L14 is executed to reduce the dimensionality, and then the same-dimensional encoding convolutional layer L14-L15 is executed. Then, a plurality of multi-stride encoding convolutional layers L15-L16, L16-L17 are performed to reduce the dimensionality.

In one embodiment, the convolutional layers L17 and Lu1 can be regarded as the turning layers of dimensionality upscaling and dimensionality reduction in this architecture.

In other words, in the example in FIG. 3, the multi-stride encoding convolutional layers are the convolutional layers L12, L14, L16, and L17. The same-dimensional encoding convolutional layers are the convolutional layer L13 and L15. The convolutional layer L11 is the initial single-stride convolutional layer with the same dimension. It can be seen that there will be one or more multi-stride encoding convolutional layers before one or more same-dimensional encoding convolutional layers will be performed.

In one embodiment, after these multi-stride encoding convolutional layers are continuously sorted, the processor 10 sequentially sorts the last multi-stride encoding convolutional layers of these multi-stride encoding convolutional layers, and the image features outputted by the last multi-stride encoding convolutional layers are input to the same-dimensional encoding convolutional layer to avoid blocking effect. The blocking effect is a visual defect. The main reason for this effect is that the blocking artifacts caused by the block-based codec make the coding of adjacent blocks in the image are similar, and the visual effect looks like a mosaic.

In one embodiment, multi-stride encoding convolutional layers are used to define the amount of kernel pixel shift when performing convolution operations.

In one embodiment, when the amount of kernel pixel shift defined by the multi-stride encoding convolutional layers for convolution operation is higher, the higher the dimensionality reduction effect, the fewer the captured image features, and the more obvious the captured image features.

In step 240, according to the corresponding multi-stride encoding convolutional layers, same-dimensional encoding convolutional layers, the processor 10 performs upscaling dimension on the corresponding plural multi-stride decoding convolutional layers and a same-dimensional decoding convolutional layer.

In one embodiment, when the multi-stride encoding convolutional layers are a plurality of 2 stride encoding convolutional layers, it means that the amount of kernel pixel shift of the convolution operation is 2 when reducing the dimension. Corresponding to these multi-stride encoding convolutional layers, when these multi-stride decoding convolutional layers are a plurality of 2 stride encoding convolutional layers, it means that the amount of kernel pixel shift of the convolution operation is 2 when upscaling the dimension.

In the example in FIG. 3, the multi-stride decoding convolutional layers are the convolutional layers Lu1, Lu3, Lu5, and Lu7. The same-dimensional decoding convolutional layers are the convolutional layer Lu2, Lu4, and Lu6. It can be seen that there will be one or more multi-stride decoding convolutional layers first, and then one or more same-dimensional decoding convolutional layers will be performed.

In one embodiment, the number of dimensionality reduction is the same as the number of dimensionality upscaling.

In one embodiment, the convolutional layer used for decoding can be referred to as a deconvolution layer.

In step 250, the deconvolution layer Lu7 inputs a result after the dimension upscale is completed to the same-dimensional decoding convolutional layer of a balanced channel, and the same-dimensional decoding convolutional layer of the balanced channel outputs a reconstructed image OT.

In one embodiment, the deconvolution layer Lu7 refers to the image feature from the convolutional layer L11 for the result after the dimension upscale is completed, and then enters the same-dimensional decoding convolutional layer (not shown) of the balanced channel. The same-dimensional decoding convolutional layer of the balanced channel is used to output the reconstructed image OT with the three primary colors of color light.

In one embodiment, the same-dimensional encoding convolutional layer is regarded as a 1 stride encoding convolutional layer. The 1-stride encoding convolutional layer is arranged after a plurality of dimensionality reduction operations. The same-dimensional decoding convolutional layer is regarded as a 1-stride decoding convolutional layer for feature extraction and removal of noise carried in the process of transmitting the distorted image through skip-connection. The 1-stride decoding convolutional layer is arranged after a plurality of dimensionality upscaling operations.

In an embodiment, the processor 10 regards the 1-stride encoding convolutional layer executed y times after executing a plurality of x-stride encoding convolutional layers as a dimensionality reduction operation unit. The dimensionality reduction operation is completed by repeatedly executing the dimensionality reduction operation unit N times. The processor 10 regards the 1-stride decoding convolutional layer y times after executing a plurality of x-stride decoding convolutional layers as an upscaling operation unit. The upscaling operation is completed by repeatedly executing the upscaling operation unit N times. N and y are positive integers, and x is a positive integer greater than 2.

In one embodiment, as in the example in FIG. 3, in the encoder used for dimensionality reduction operations, there are a total of 7 convolutional layers in the process of dimensionality reduction operations, 3 same-dimensional encoding convolutional layers (64, 128, 256) for performing feature extraction, and 4 multi-stride encoding convolutional layers for performing four downsampling and feature extraction. In the feature extraction of the same-dimensional encoding convolutional layer (64, 128, 256), take 64 as an example, 64 represents the number of convolution kernels used. The two-dimensional size of the convolution kernel is 3*3, and 64 represents the depth of the convolution layer (using several convolution kernels), so 3*3*64 is generally used to represent the convolution layer. The meaning of 128 and 256 means that 128 convolution kernels and 256 convolution kernels are used, respectively.

Each dimensionality reduction feature map will be passed to the corresponding transposed convolutional layer (i.e., multi-stride decoding convolutional layers) through skip connections. Therefore, in the decoder used for the upscaling operation, there are provided corresponding four transposed convolutional layers (i.e., multi-stride decoding convolutional layers).

Since the amount of kernel pixel shift (step) defined by these multi-stride encoding convolutional layers for convolution operations is higher, the dimensionality reduction effect is higher, and the captured image features are more obvious (for example, when the resolution of the distorted image is large enough, a step of 3 or more can be used). Therefore, through multi-stride decoding of the convolutional layer, obvious image features can be captured faster, and the number of layers for dimensionality reduction operations can be greatly reduced, which can reduce the calculation time required for the noise reduction convolutional auto-encoding model 30 in the training stage. Moreover it can at least achieve the accuracy equivalent to or better than the traditional one-stride encoding convolutional layer to train the model. In addition, the processor 10 executes a 1-stride encoding convolutional layer, which can be used for feature extraction and remove noise transmitted by skip-connection.

In one embodiment, the noise reduction convolutional auto-encoding model 30 is used to restore a variety of distorted images (such as distorted image IT) to generate a reconstructed image OT. In one embodiment, the distorted image IT is, for example, a Gaussian noise image, a Gaussian blur image, a motion blur image, a speckle noise image, and/or a salt and pepper noise image.

In one embodiment, noise reduction convolutional auto-encoding model 30 uses batch normalization after each convolutional layer to reduce overfitting and gradient vanishing. LeakyReLU is used as the activation function to reduce the appearance of dead neurons.

In one embodiment, in the architecture of the noise reduction convolutional auto-encoding model 30, convolutional layers and transposed convolutional layers controlled by strides (i.e., multi-stride decoding convolutional layers) are used to replace traditional max-pooling and upsampling. The up-and-down dimension of the image can be used to obtain better distortion removal performance. Adding a convolutional layer (i.e., same-dimensional decoding convolutional layer) after each transposed convolutional layer of the decoder (i.e., multi-stride decoding convolutional layers) is to prevent transposed convolutional layers (i.e., multi-stride decoding convolutional layers) from causing the blocking effect that affects the restored feature map. Moreover, feature extraction is performed to reduce the noise transmitted by skip-connections.

In one embodiment, the training samples used by the noise reduction convolutional auto-encoding model 30 in the training stage include: multiple Gaussian noise images, multiple Gaussian blur images, multiple motion blur images, multiple speckle noise images, and multiple salt and pepper noise images.

In one embodiment, the noise reduction convolutional auto-encoding model 30 is used in the application stage to receive and restore multiple Gaussian noise images, multiple Gaussian blur images, multiple motion blur images, multiple speckle noise images, and multiple salt and pepper noise images to generate a reconstructed image.

In one embodiment, noise reduction convolutional auto-encoding model 30 is used in the training stage to combine mean-square error (MSE) and structural similarity index measurement (SSIM) to design a loss function, to update the weights or converge, and input images with different distortion types into noise reduction convolutional auto-encoding model 30 for training.

In one embodiment, in order to adapt the noise reduction convolutional auto-encoding model 30 to different types of distortion patterns, combine mean-square error (MSE) and structural similarity index measurement (SSIM) are used as the loss function to train the model. The direction of the gradient update can be affected by structural similarity index measurement and mean-square error at the same time, so that the reconstructed picture is closer to human vision and maintains a smaller numerical error with the original picture, which can handle various distortions. Combined loss function formula:

$$\text{Loss}(x,y) = \alpha \cdot (1 - \text{SSIM}(x,y)) + \beta \cdot \text{MSE}(x,y);$$

where x, y represent the input and output images, and $\alpha$ and $\beta$ are hyper parameters. During the training process, before inputting the distorted image IT into the noise reduction convolutional auto-encoding model 30, the processor 10 normalizes the distorted image IT and finds that the loss of SSIM drops faster than the loss of MSE, which means that the contribution of SSIM is greater than MSE in each epoch, and the value ratio is about 2:1. Therefore, the processor 10 sets $\alpha=0.33$ and $\beta=0.66$ to balance the contributions of SSIM and MSE. The value here is only an example and is not limited thereto.

In one embodiment, the noise reduction convolutional auto-encoding model 30 can also use peak signal-to-noise ratio (PSNR), structural similarity index (SSIM index), objective average score of the human eye, or other algorithms to design the loss function in the training stage. The design of the loss function is not limited thereto.

Please refer to FIGS. 4A to 4E. FIGS. 4A to 4E are schematic diagrams illustrating different distortion types in accordance with one embodiment of the present disclosure. In FIGS. 4A to 4E, the larger σ, the more noise, and the larger the SNR, the less distortion.

Figure 4A:
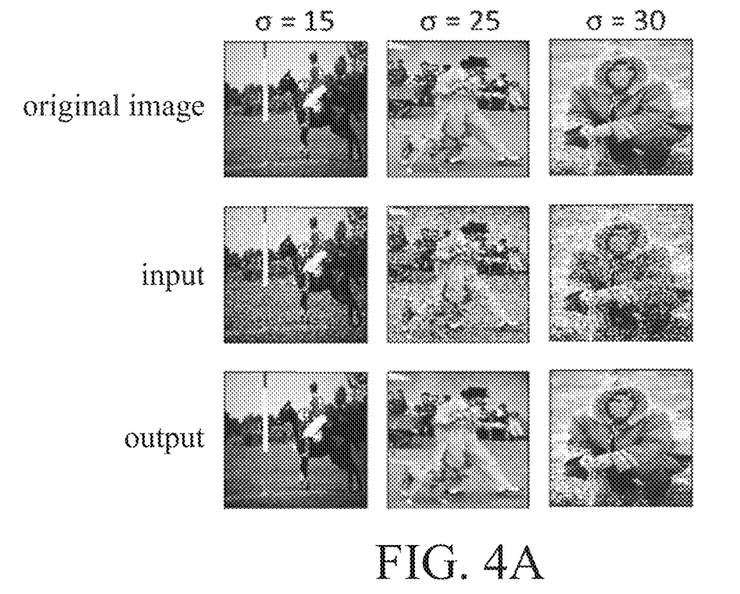
FIGS. 4A-4E are schematic diagrams illustrating different distortion types in accordance with one embodiment of the present disclosure.

FIG. 4A is the Guassian noise image, the first horizontal row is the original image, the second row is the distorted image input to noise reduction convolutional auto-encoding model 30, and the third row is the noise image output by the noise reduction convolutional auto-encoding model 30.

Figure 4B:
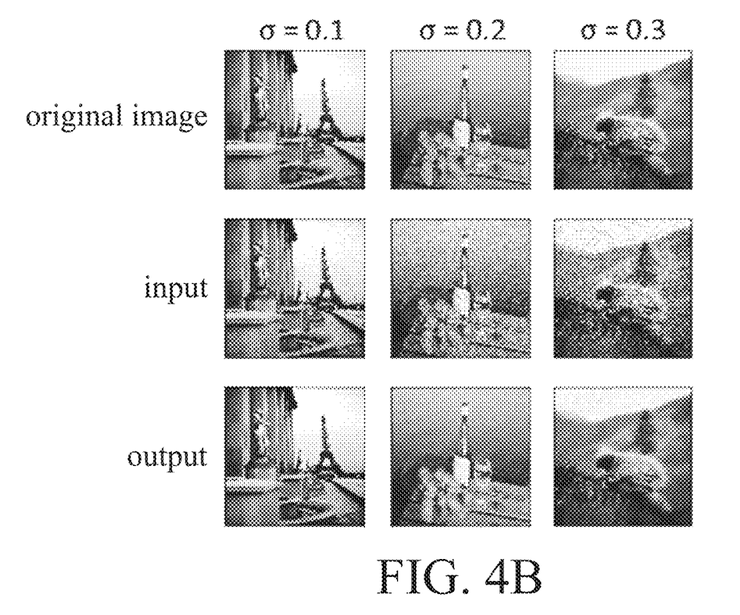

FIG. 4B is the speckle noise image, and the first row is the original image, the second row is the distorted image input to noise reduction convolutional auto-encoding model 30, and the third row is the noise image output by the noise reduction convolutional auto-encoding model 30.

Figure 4C:
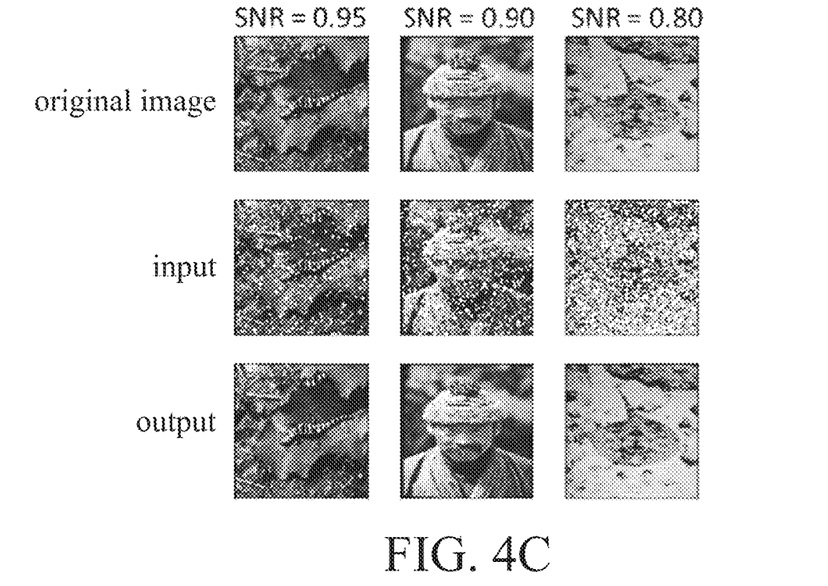

FIG. 4C is the salt and pepper noise image, the first horizontal row is the original image, the second row is the distorted image input to noise reduction convolutional auto-encoding model 30, and the third row is the noise image output by the noise reduction convolutional auto-encoding model 30.

Figure 4D:
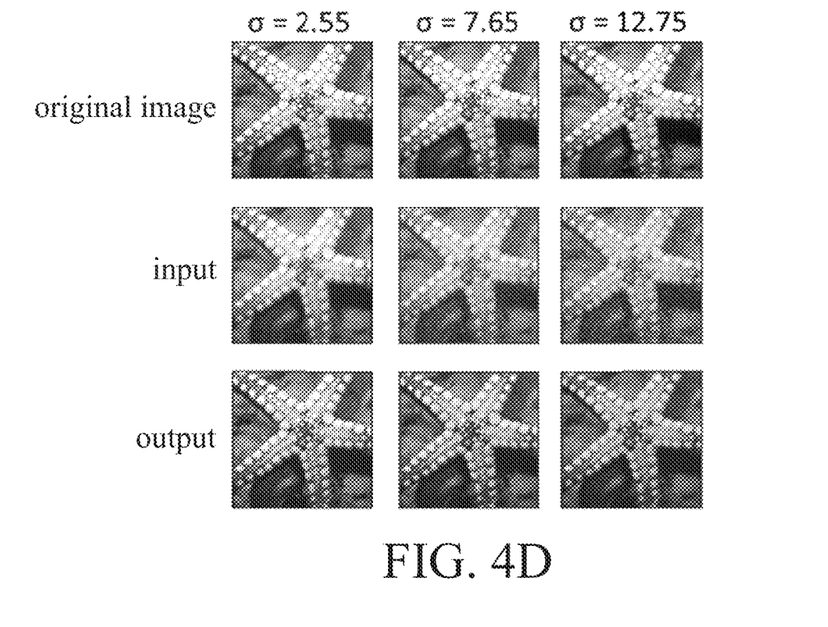

FIG. 4D is motion blur image, the first horizontal row is the original image, the second row is the distorted image input to noise reduction convolutional auto-encoding model 30, the third row is the noise image output by the noise reduction convolutional auto-encoding model 30.

Figure 4E:
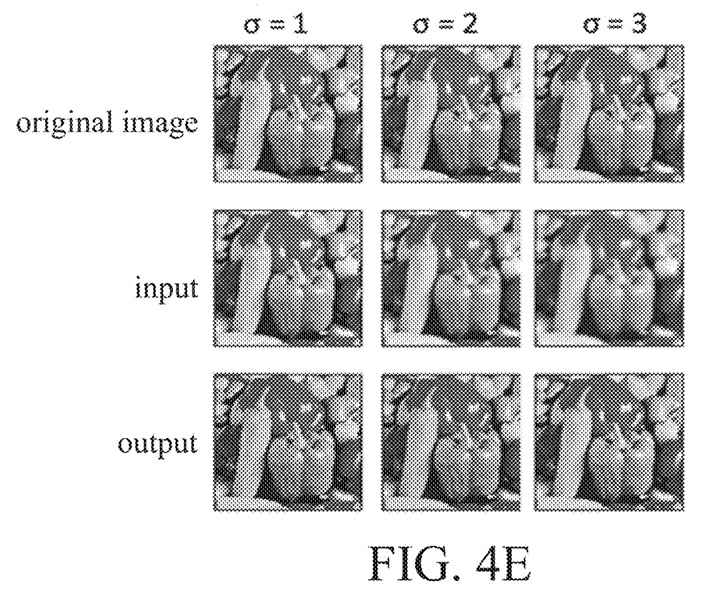

FIG. 4E is a Gaussian blur image the first horizontal row is the original image, the second row is the distorted image input to noise reduction convolutional auto-encoding model 30, the third row is the noise image output by the noise reduction convolutional auto-encoding model 30.

It can be seen from FIGS. 4A to 4E above that after inputting distorted images with different distortion types into noise reduction convolutional auto-encoding model 30, noise reduction convolutional auto-encoding model 30 can output noise reduction and restored reconstructed images.

In one embodiment, three data sets Set5, Set12, and BSD68 are used to objectively compare the performance of the noise reduction convolutional auto-encoding model 30 with other technologies that specifically remove a single noise (Gaussian noise).

For Gaussian noise, three different levels of tests are performed, σ={15, 25, 30}, and the results of the denoising report of Gaussian noise under the same test conditions are cited in the document [3], and BM3D [1], DnCNN-B [2] and FC-AIDE [3] perform performance comparison, and the results are shown in Table 1.

TABLE 1

| data set | noise level | BM3D [1](PSNR/ SSIM) | DnCNN-B [2](PSNR/ SSIM) | FC-AIDE [3](PSNR/ SSIM) | noise reduction convolutional auto-encoding model 30(PSNR/ SSIM) |
|---|---|---|---|---|---|
| Set 5 | σ = 15 | 29.64/ 0.8983 | 28.76/ 0.9364 | 30.69/ 0.9514 | 31.14/ 0.8890 |
|  | σ = 25 | 26.47/ 0.8983 | 26.14/ 0.8948 | 27.83/ 0.9182 | 29.84/ 0.8324 |
|  | σ = 30 | 25.32/ 0.8764 | 25.15/ 0.8735 | 26.80/ 0.9030 | 29.45/ 0.8156 |
| Set 12 | σ = 15 | 32.15/ 0.8856 | 32.50/ 0.8899 | 32.91/ 0.8995 | 32.48/ 0.9121 |
|  | σ = 25 | 29.67/ 0.8327 | 30.15/ 0.8435 | 30.51/ 0.8545 | 30.74/ 0.8549 |
|  | σ = 30 | 28.74/ 0.8085 | 29.30/ 0.8233 | 29.63/ 0.8353 | 29.94/ 0.8287 |
| BSD 68 | σ = 15 | 31.07/ 0.8717 | 31.40/ 0.8804 | 31.71/ 0.8897 | 31.68/ 0.8633 |
|  | σ = 25 | 28.56/ 0.8013 | 28.99/ 0.8132 | 29.26/ 0.8267 | 29.68/ 0.8286 |
|  | σ = 30 | 27.74/ 0.7727 | 28.17/ 0.7847 | 28.44/ 0.7995 | 28.84/ 0.8063 |

BM3D [1], DnCNN-B [2] and FC-AIDE [3] only process the Gaussian noise image and output the PSNR/SSIM value. The noise reduction convolutional auto-encoding model 30 can handle Gaussian noise image, Gaussian blur image, motion blur image, speckle noise image, and salt and pepper noise image.

The document [1] is "K. Dabov, A. Foi, V. Katkovnik, and K. Egiazarian. Image denoising by sparse 3-d transform-domain collaborative filtering. IEEE Trans. Image Processing, 16(8)): 2080-2095, 2007".

The document [2] is "K. Zhang, W. Zuo, Y. Chen, D. Meng, and L. Zhang. Beyond a Gaussian denoiser: Residual learning of deep CNN for image denoising. IEEE Trans. Image Processing, 26(7):3142-3155, 2017".

The document [3] is "S. Cha and T. Moon, "Fully convolutional pixel adaptive image denoiser," in Proc. IEEE Int. Conf. Comput. Vis., Seoul, South Korea, October 2019, pp. 4160-4169".

For salt and pepper noise and speckle noise, compare the output of the noise reduction convolutional auto-encoding model 30 with BM3D [1] and DnCNN [2], both are only designed to remove Gaussian noise, and their source code can be obtained online for simulation. Salt and pepper noise and speckle noise are also evaluated at three different levels. Salt and pepper noise: SNR={0.95, 0.90, 0.80}, speckle noise: σ={0.1, 0.2, 0.3}, the results are shown in Table 2 and Table 3, respectively.

TABLE 2

| dataset | noise level | BM3D [1](PSNR/ SSIM) | DnCNN [2](PSNR/ SSIM) | noise reduction convolutional auto-encoding model 30(PSNR/ SSIM) |
|---|---|---|---|---|
| Set 5 | SNR = 0.95 | 24.84/ 0.6305 | 19.68/ 0.5585 | 31.95/ 0.9097 |
|  | SNR = 0.90 | 22.46/ 0.5164 | 16.49/ 0.3665 | 31.03/ 0.9036 |
|  | SNR = 0.80 | 16.86/ 0.2641 | 13.30/ 0.2121 | 30.10/ 0.8567 |
| Set 12 | SNR = 0.95 | 25.32/ 0.6591 | 20.86/ 0.6110 | 33.60/ 0.9507 |
|  | SNR = 0.90 | 23.67/ 0.5689 | 17.42/ 0.4041 | 32.24/ 0.9419 |
|  | SNR = 0.80 | 17.96/ 0.2816 | 14.03/ 0.2347 | 30.73/ 0.8864 |

TABLE 2-continued

| dataset | noise level | BM3D [1](PSNR/ SSIM) | DnCNN [2](PSNR/ SSIM) | noise reduction convolutional auto-encoding model 30(PSNR/ SSIM) |
|---|---|---|---|---|
| BSD 68 | SNR = 0.95 | 23.80/ 0.5723 | 20.06/ 0.5616 | 32.72/ 0.9302 |
|  | SNR = 0.90 | 22.10/ 0.4858 | 16.92/ 0.3743 | 31.07/ 0.9013 |
|  | SNR = 0.80 | 17.19/ 0.2727 | 13.73/ 0.2201 | 30.93/ 0.8802 |

TABLE 3

| dataset | noise level | BM3D [1](PSNR/ SSIM) | DnCNN [2](PSNR/ SSIM) | noise reduction convolutional auto-encoding model 30(PSNR/ SSIM) |
|---|---|---|---|---|
| Set 5 | σ = 0.1 | 29.15/ 0.8295 | 30.99/ 0.9211 | 32.47/ 0.8939 |
|  | σ = 0.2 | 28.28/ 0.7970 | 26.91/ 0.8124 | 31.37/ 0.8591 |
|  | σ = 0.3 | 25.29/ 0.6645 | 20.96/ 0.6624 | 30.76/ 0.8313 |
| Set 12 | σ = 0.1 | 28.38/ 0.8221 | 30.32/ 0.9152 | 33.39/ 0.9356 |
|  | σ = 0.2 | 27.85/ 0.7861 | 26.23/ 0.8041 | 32.57/ 0.9013 |
|  | σ = 0.3 | 24.77/ 0.6343 | 19.75/ 0.5743 | 31.53/ 0.8693 |
| BSD 68 | σ = 0.1 | 25.05/ 0.6966 | 28.65/ 0.8715 | 33.19/ 0.8997 |
|  | σ = 0.2 | 24.89/ 0.6875 | 26.48/ 0.8245 | 31.43/ 0.8631 |
|  | σ = 0.3 | 24.18/ 0.6207 | 21.22/ 0.6605 | 30.64/ 0.8354 |

BM3D [1] and DnCNN [2] in Table 2 and Table 3 can only remove Gaussian noise and output the PSNR/SSIM value. The noise reduction convolutional auto-encoding model 30 can handle Gaussian noise image, Gaussian blur image, motion blur image, speckle noise image, and salt and pepper noise image.

Experiments show that noise reduction convolutional auto-encoding model 30 can use a single model to remove three types of distortion at the same time. From Table 1 to Table 3, it can be seen that noise reduction convolutional auto-encoding model 30 achieves the same level of performance in removing Gaussian noise as the known technology. Moreover, it also significantly improves the ability to remove other types of distortion such as salt and pepper noise and speckle noise. It can simultaneously reduce speckle noise and salt and pepper noise, and has excellent performance, which is better than other technologies that specifically remove single noise (Gaussian noise).

In FIGS. 4A-4C, noise reduction convolutional auto-encoding model 30 also shows the visualization results in the CBSD68 data set. Through a single model, all types and levels of noise can be removed.

In one embodiment, the noise reduction convolutional auto-encoding model 30 can be used in combination with the deep convolutional neural network VGG-16. In order to verify the effectiveness of the auto-encoder in improving the accuracy of image recognition, the noise reduction convolutional auto-encoding model 30 is combined with the deep convolutional neural network VGG-16. It means that the distorted image will go through the noise reduction convolutional auto-encoding model before entering the deep convolutional neural network (DCNN) for classification. The calculation framework for training and inference is shown in FIGS. 5A-5B.

Figure 5A:
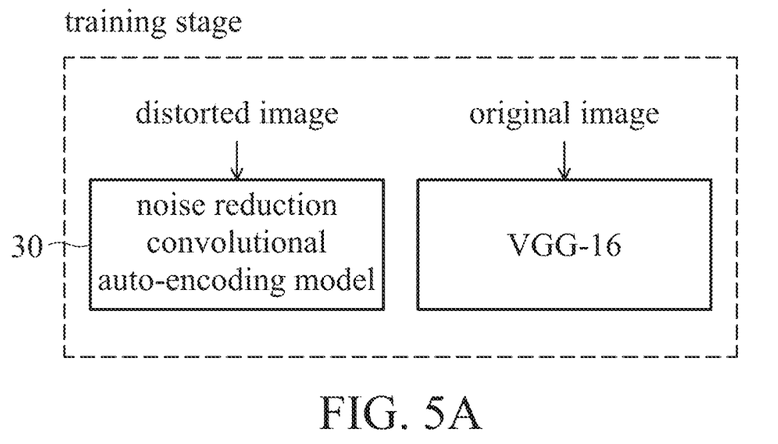
FIG. 5A is a schematic diagram of the noise reduction convolutional auto-encoding model and VGG-16 in the training stage according to an embodiment of the present invention.

FIG. 5A is a schematic diagram of the noise reduction convolutional auto-encoding model 30 and VGG-16 in the training stage according to an embodiment of the present invention. In FIG. 5A, the noise reduction convolutional auto-encoding model 30 and the deep convolutional neural network VGG-16 are trained separately in the training stage. More specifically, in the training stage, the distorted image is input to the noise reduction convolutional auto-encoding model 30, and the original image (the undistorted image) is input to the deep convolutional neural network VGG-16.

Figure 5B:
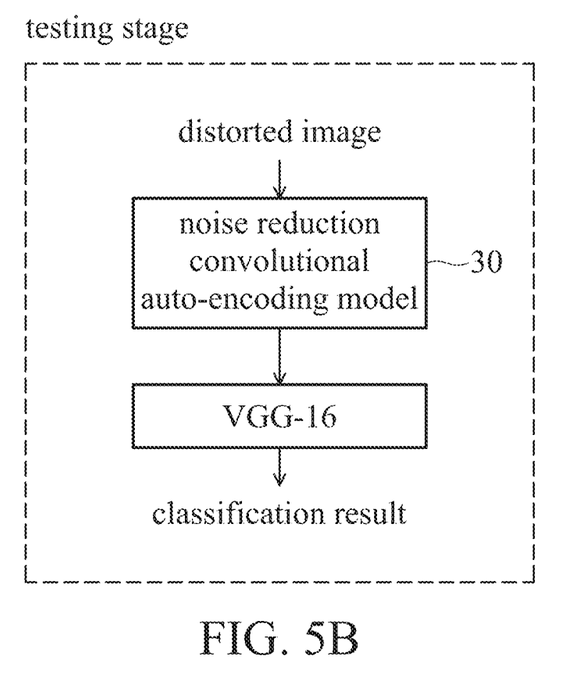
FIG. 5B is a schematic diagram of the noise reduction convolutional auto-encoding model and VGG-16 in the testing stage in accordance with one embodiment of the present disclosure.
Figure 6A:
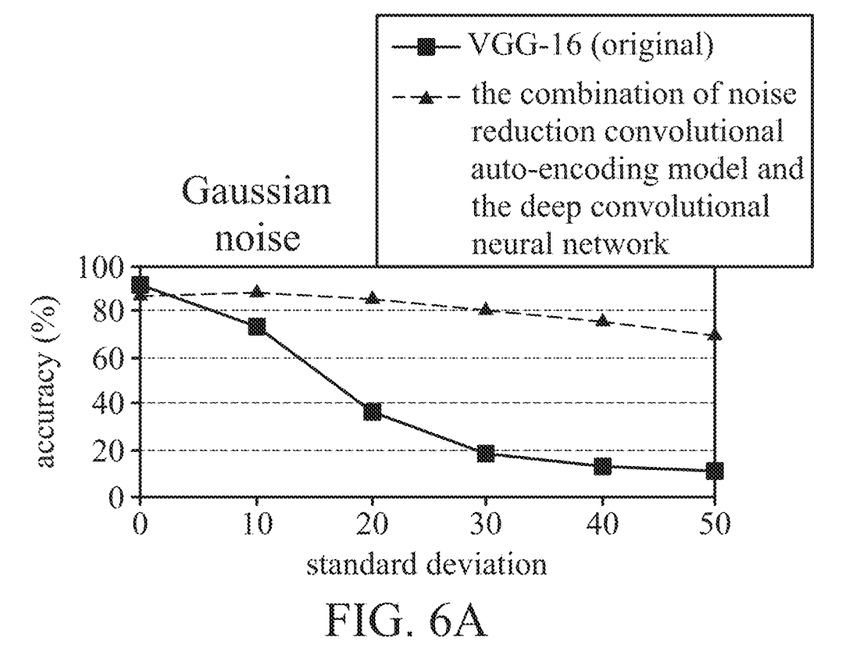
FIGS. 6A-6E are schematic diagrams illustrating the comparison of the results of the noise reduction convolutional auto-encoding model and VGG-16 combined with the classification accuracy of the original VGG-16 model in various types and levels of the distorted image according to an embodiment of the present invention.
Figure 6B:
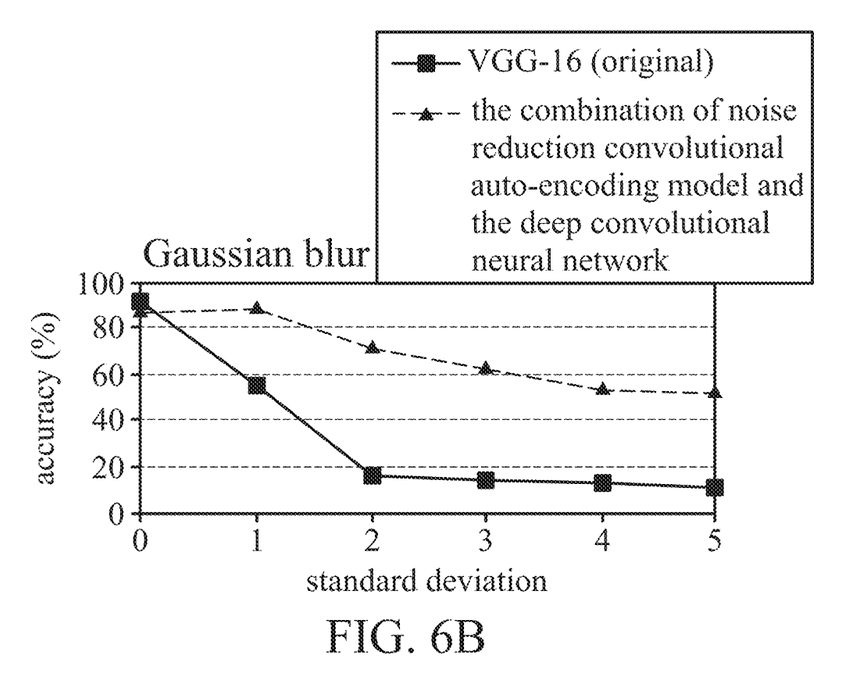
Figure 6C:
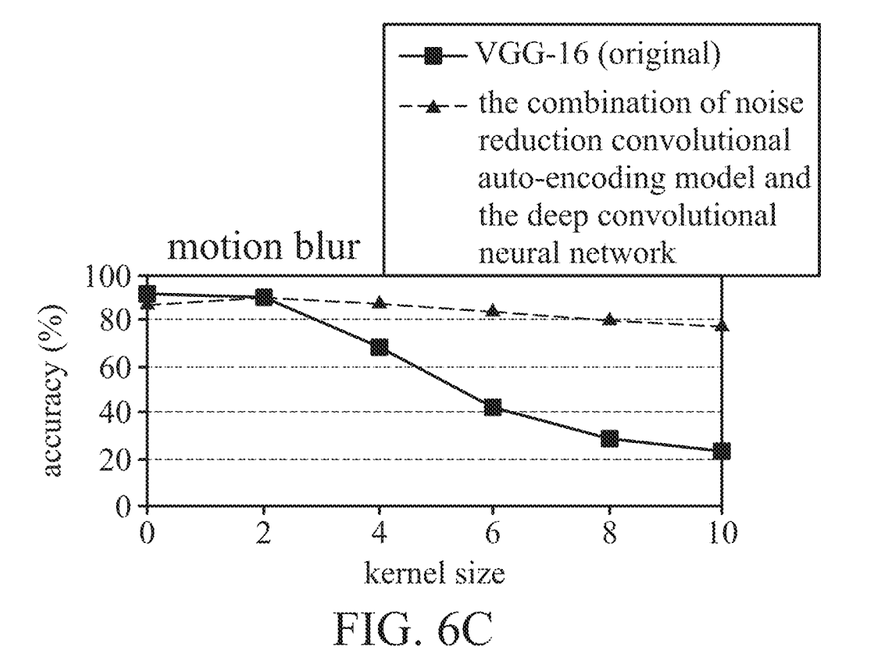
Figure 6D:
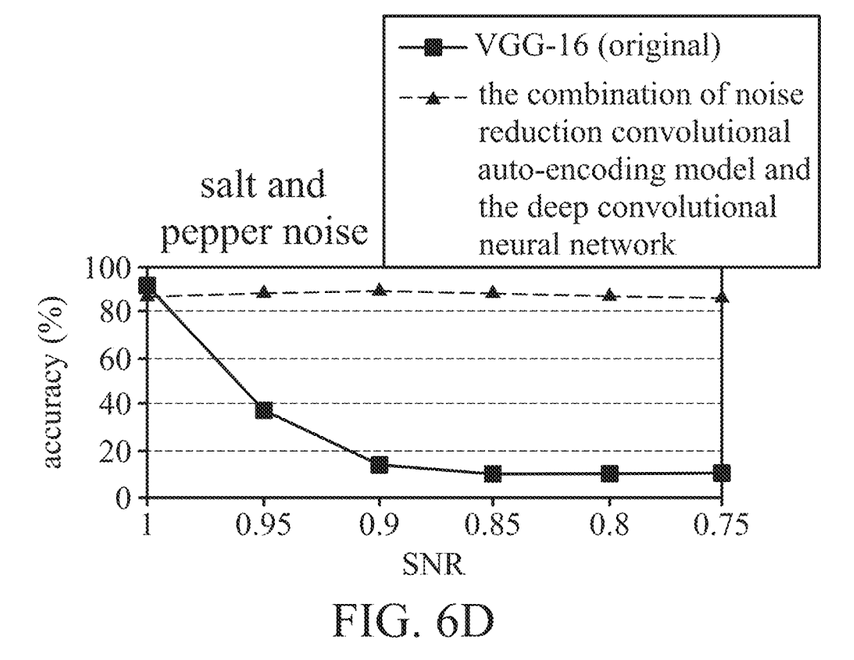
Figure 6E:
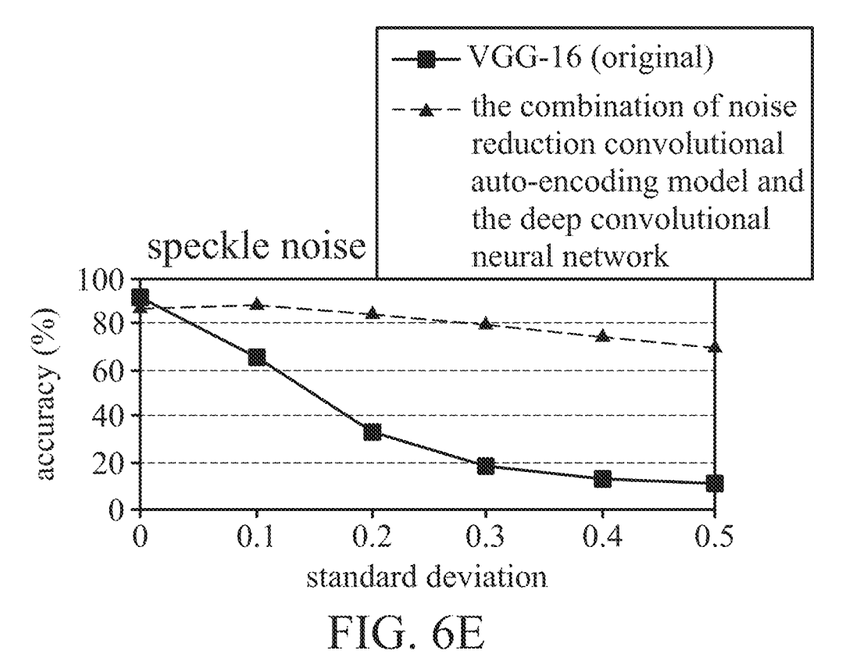

FIG. 5B is a schematic diagram of the noise reduction convolutional auto-encoding model 30 and VGG-16 in the testing stage in accordance with one embodiment of the present disclosure. In FIG. 5B, the distorted image is input to noise reduction convolutional auto-encoding model 30. The noise reduction convolutional auto-encoding model 30 inputs the output reconstructed image to the deep convolutional neural network VGG-16 to output a classification result.

In one embodiment, the processor 10 compares the combined result of the noise reduction convolutional auto-encoding model 30 and the VGG-16 with the classification accuracy of the original VGG-16 model under various types and levels of the distorted image. Taking the data set CIFAR-10 as an example, the processor 10 tests 5 increasing levels of corresponding types of noise and blur distortion (Gaussian noise image, Gaussian blur image, motion blur image, speckle noise image, and salt and pepper noise image). As shown in FIGS. 6A to 6E, FIGS. 6A to 6E are schematic diagrams illustrating the comparison of the results of the noise reduction convolutional auto-encoding model 30 and VGG-16 combined with the classification accuracy of the original VGG-16 model in various types and levels of the distorted image according to an embodiment of the present invention. It can be seen from FIGS. 6A to 6E that the classification accuracy of the combination of the noise reduction convolutional auto-encoding model 30 and the deep convolutional neural network VGG-16 is much higher than that of only the deep convolutional neural network VGG-16.

Experiments show that the combined noise reduction convolutional auto-encoding model 30 and VGG-16 have significantly higher accuracy rates in five different types and levels of distortion than the original VGG-16 model, and it only needs to be trained once. The noise reduction convolutional auto-encoding model 30 can simultaneously remove noise and blurring with 5 different distortion types for small-size images (CIFAR-10/100).

The method of the present invention, or a specific type or part thereof, may exist in the form of code. The program code can be included in physical media, such as floppy disks, CDs, hard disks, or any other machine-readable (such as computer-readable) storage media, or computer program products that are not limited to external forms. When the program code is loaded and executed by a machine, such as a computer, the machine becomes a device for participating in the present invention. The code can also be transmitted through some transmission media, such as wire or cable, optical fiber, or any transmission type. When the code is received, loaded and executed by a machine, such as a computer, the machine becomes used to participate in this Invented device. When implemented in the same-dimensional purpose processing unit, the program code combined with the processing unit provides a unique device that operates similar to the application of a specific logic circuit.

The noise reduction convolutional auto-encoding device and the noise reduction convolutional auto-encoding method described in present invention can simultaneously denoise or eliminate blurring of different types of distorted images, and the noise reduction convolutional auto-encoding device has a simple structure, only need to train once. By using skip-connection to transfer image features to the deconvolution layer, it helps deconvolution to restore a better, clearer image. Using multi-stride encoding convolutional layers and multi-stride decoding convolutional layers to increase/decrease the dimensionality of the image can achieve better denoising performance. Moreover, adding the same-dimensional encoding convolutional layer/same-dimensional decoding convolutional layer after multi-stride encoding convolutional layers/multi-stride decoding convolutional layers can prevent blocking effect caused by multi-stride encoding convolutional layers/multi-stride decoding convolutional layers, due to the blocking effect will affect the restored feature image. Then, performing the feature extraction again can reduce the noise transmitted by skip-connection.

In addition, noise reduction convolutional auto-encoding device and noise reduction convolutional auto-encoding method design a loss function by combining the mean square error and structural similarity index measurement to update the weights. When finally performing collaborative training on pictures with different distortion types, the weights can adapt to different distortions. The foregoing experimental results show that the noise reduction convolutional auto-encoding device used for noise reduction not only achieves the same level as the known technology in reducing Gaussian noise, but can also reduce noise for speckle noise and salt and pepper noise at the same time. Moreover, the noise reduction convolutional auto-encoding device and noise reduction convolutional auto-encoding method have excellent performance. The noise reduction convolutional auto-encoding device is also a noise reduction convolutional auto-encoding device used to eliminate blur. It can eliminate Gaussian blur and motion blur at the same time with the same performance as other documents.

In addition, through noise reduction convolutional auto-encoding device and noise reduction convolutional auto-encoding method combine noise reduction convolutional auto-encoding model and deep convolutional neural network (VGG-16), the application of the noise reduction convolutional auto-encoding device can significantly improve the accuracy of convolutional network recognition of distorted images, and proved that a single noise reduction convolutional auto-encoding model only needs to be trained once, so as to achieve the effect of reconstructing images from a variety of different types of distortion images.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but are to be accorded the widest scope consistent with the principles and novel features disclosed herein.

What is claimed is:

1. A noise reduction convolutional auto-encoding device, comprising:
   a processor; and
   a storage device, wherein the processor is configured to access a noise reduction convolutional auto-encoding model stored in the storage device to execute the noise reduction convolutional auto-encoding model, wherein the processor executes:
   receiving a distorted image, and inputting the distorted image into the noise reduction convolutional auto-encoding model;
   in the noise reduction convolutional auto-encoding model, an image feature of the distorted image is transferred to a first deconvolution layer through skip-connection;
   performing a plurality of multi-stride encoding convolutional layers for the distortion image to reduce a dimension, and then performing a same-dimensional encoding convolutional layer;
   according to the corresponding multi-stride encoding convolutional layers and the same-dimensional encoding convolutional layer, performing upscaling dimension on a plurality of multi-stride decoding convolutional layers and a same-dimensional decoding convolutional layer; and
   inputting a result of up-scaled dimension to the same-dimensional decoding convolutional layer of a balanced channel using the first deconvolution layer, and outputting a reconstructed image via the same-dimensional decoding convolutional layer of the balanced channel;
   wherein after the distorted image is input to the noise reduction convolutional auto-encoding model, each of the multi-stride encoding convolutional layers and the same-dimensional encoding convolutional layer in the noise reduction convolutional auto-encoding model respectively outputs the image feature, and transmits each image feature to the corresponding multi-stride decoding convolutional layers and the same-dimensional decoding convolutional layer through skip-connection.

2. The noise reduction convolutional auto-encoding device as claimed in claim 1, wherein the image feature transmitted to the multi-stride decoding convolutional layers or the same-dimensional decoding convolutional layer is used as a reference feature during decoding.

3. The noise reduction convolutional auto-encoding device as claimed in claim 1, wherein the multi-stride encoding convolutional layers are used to define an amount of kernel pixel shift when performing convolution operations.

4. The noise reduction convolutional auto-encoding device as claimed in claim 1, wherein after the multi-stride encoding convolutional layers are continuously sorted, the processor sequentially sorts the last multi-stride encoding convolutional layers of the multi-stride encoding convolutional layers, and inputs the output image features to the same-dimensional encoding convolutional layer to avoid blocking effects.

5. A noise reduction convolutional auto-encoding method, comprising:
   receiving a distorted image, and inputting the distorted image into a noise reduction convolutional auto-encoding model;

in the noise reduction convolutional auto-encoding model, an image feature of the distorted image is transferred to a first deconvolution layer through skip-connection;

performing a plurality of multi-stride encoding convolutional layers for the distortion image to reduce a dimension, and then performing a same-dimensional encoding convolutional layer;

according to the corresponding multi-stride encoding convolutional layers and the same-dimensional encoding convolutional layer, performing upscaling dimension on a plurality of multi-stride decoding convolutional layers and a same-dimensional decoding convolutional layer; and inputting the result of up-scaled dimension to the same-dimensional decoding convolutional layer of a balanced channel using the first deconvolution layer, and outputting a reconstructed image using the same-dimensional decoding convolutional layer of the balanced channel;

wherein after the distorted image is input to the noise reduction convolutional auto-encoding model, each of the multi-stride encoding convolutional layers and the same-dimensional encoding convolutional layer in the noise reduction convolutional auto-encoding model respectively outputs the image feature, and transmits each image feature to the corresponding multi-stride decoding convolutional layers and the same-dimensional decoding convolutional layer through skip-connection.

6. The noise reduction convolutional auto-encoding method as claimed in claim 5, wherein the image feature transmitted to the multi-stride decoding convolutional layers or the same-dimensional decoding convolutional layer is used as a reference feature during decoding.

7. The noise reduction convolutional auto-encoding method as claimed in claim 5, wherein the multi-stride encoding convolutional layers are used to define the amount of kernel pixel shift when performing convolution operations.

8. The noise reduction convolutional auto-encoding method as claimed in claim 5, wherein after the multi-stride encoding convolutional layers are continuously sorted, the noise reduction convolutional auto-encoding method further comprises:

sequentially sorting the last multi-stride encoding convolutional layers of the multi-stride encoding convolutional layers, and inputting the output image features to the same-dimensional encoding convolutional layer to avoid blocking effects.

* * * * *